(12) United States Patent
Liu et al.

(10) Patent No.: US 11,373,646 B2
(45) Date of Patent: Jun. 28, 2022

(54) HOUSEHOLD APPLIANCE CONTROL METHOD, DEVICE AND SYSTEM, AND INTELLIGENT AIR CONDITIONER BY DETERMINING USER SOUND SOURCE LOCATION BASED ON ANALYSIS OF MOUTH SHAPE

(71) Applicant: GREE ELECTRIC APPLIANCES, INC. OF ZHUHAI, Guangdong (CN)

(72) Inventors: Guangyou Liu, Guangdong (CN); Wencheng Zheng, Guangdong (CN); Yuehui Mao, Guangdong (CN); Zi Wang, Guangdong (CN); Yao Chen, Guangdong (CN); Bo Liang, Guangdong (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 489 days.

(21) Appl. No.: 16/330,642

(22) PCT Filed: Feb. 14, 2017

(86) PCT No.: PCT/CN2017/073466
§ 371 (c)(1),
(2) Date: Mar. 5, 2019

(87) PCT Pub. No.: WO2018/049782
PCT Pub. Date: Mar. 22, 2018

(65) Prior Publication Data
US 2021/0280179 A1 Sep. 9, 2021

(30) Foreign Application Priority Data
Sep. 19, 2016 (CN) .......................... 201610832923.2

(51) Int. Cl.
*G06F 3/01* (2006.01)
*G05D 1/00* (2006.01)
(Continued)

(52) U.S. Cl.
CPC .............. *G10L 15/22* (2013.01); *F24F 11/50* (2018.01); *G10L 15/25* (2013.01); *H04L 12/2816* (2013.01); *H04R 3/005* (2013.01)

(58) Field of Classification Search
CPC .... G06F 3/017; G05D 1/0088; G05D 1/0022; G11B 27/106; G10L 15/25
(Continued)

(56) References Cited

U.S. PATENT DOCUMENTS 9,807,492 B1 * 10/2017 Campbell ............... G10L 15/25
2015/0052253 A1 2/2015 Johnson et al.
(Continued)

FOREIGN PATENT DOCUMENTS

| CN | 101656908 A | 2/2010 |
| CN | 102135882 A | 7/2011 |

(Continued)

OTHER PUBLICATIONS

International Search Report for International Application No. PCT/CN2017/073466, dated Jun. 5, 2017, 2 pages.

*Primary Examiner* — Farzad Kazeminezhad
(74) *Attorney, Agent, or Firm* — Armstrong Teasdale LLP

(57) ABSTRACT

A household appliance control method, device and system, and an intelligent air conditioner are provided. The method includes that: a sound source location is determined by means of a camera; voice information of a user is picked up according to the sound source location; and at least one control operation is performed on a household appliance according to the voice information. The voice information matches at least one corresponding control instruction. By (Continued)

means of the method, a location of at least one user can be detected according to the camera, thereby enhancing at least one pickup audio signal at the location of the at least one user.

14 Claims, 2 Drawing Sheets

(51) Int. Cl.
*G10L 15/22* (2006.01)
*F24F 11/50* (2018.01)
*G10L 15/25* (2013.01)
*H04L 12/28* (2006.01)
*H04R 3/00* (2006.01)

(58) Field of Classification Search
USPC .......................................................... 701/28
See application file for complete search history.

(56) References Cited

U.S. PATENT DOCUMENTS

| | | | |
|---|---|---|---|
| 2016/0167648 A1* | 6/2016 | James | G06F 3/017 701/28 |
| 2016/0283191 A1* | 9/2016 | Lu | G11B 27/105 |
| 2017/0123423 A1* | 5/2017 | Sako | G05D 1/0088 |
| 2018/0068505 A1* | 3/2018 | Mullett | G05D 1/0022 |

FOREIGN PATENT DOCUMENTS

| | | |
|---|---|---|
| CN | 204358886 U | 5/2015 |
| CN | 204390737 U | 6/2015 |
| CN | 104879882 A | 9/2015 |
| CN | 105184214 A | 12/2015 |
| CN | 205038456 U | 2/2016 |
| CN | 105700372 A | 6/2016 |
| CN | 205351642 U | 6/2016 |
| JP | 2008196842 A | 8/2008 |
| JP | 2011012907 A | 1/2011 |

\* cited by examiner

HOUSEHOLD APPLIANCE CONTROL METHOD, DEVICE AND SYSTEM, AND INTELLIGENT AIR CONDITIONER BY DETERMINING USER SOUND SOURCE LOCATION BASED ON ANALYSIS OF MOUTH SHAPE

CROSS-REFERENCE TO RELATED APPLICATIONS

The present disclosure is the national stage entry of International Patent Application No. PCT/CN2017/073466, filed on Feb. 14, 2017, which claims the benefit of priority to Chinese Patent Application No. 201610832923.2, filed to the China Patent Office on Sep. 19, 2016, entitled "Household Appliance Control Method, Device and System, and Intelligent air conditioner", the contents of which are hereby incorporated by reference in their entirety.

TECHNICAL FIELD

The present disclosure relates to the technical field of household appliances, and in particular to a household appliance control method, device and system, and an intelligent air conditioner.

BACKGROUND

With the development of smart homes, household appliances will become more and more intelligent and functionally diversified, and air conditioners with voice intelligent control will gradually become popular. However, for some groups such as people who don't speak Mandarin or are dumb, it cannot be experienced. For another image-based gesture interaction mode, since a gesture action is single, when the gesture action is irregular, it is easy to cause malfunction, so the experience is so poor.

Installation locations of part of household appliances are relatively fixed, and a location of a user is also close to these part of household appliances (such as at least one television and at least one lamp), which can achieve a good voice recognition effect. However, for an air conditioner with voice control, a general cabinet machine is installed in a corner, and the location of the user may be far away from the air conditioner, and the poor voice recognition effect is easily caused due to signal attenuation. In the related art, an array type dual microphone is generally used for realizing to pick up at least one audio signal through a directional enhanced way, and the voice recognition effect is improved. However, when a user sends a voice control instruction during movement or other users in different directions send at least one voice control instruction, since positioning is not updated in time, the pickup audio signal cannot be enhanced against a place where a person exists, resulting in a low recognition rate.

In view of a problem in the related art of low accuracy of home appliance voice recognition, no effective solution has been proposed yet.

SUMMARY

At least some embodiments of the present disclosure provide a household appliance control method, device and system, and an intelligent air conditioner, so as to at least partially solve the problem in the related art of low accuracy of household appliance voice recognition.

In order to solve the above technical problem, the present disclosure provides a household appliance control method. The method may include that: determining a sound source location by means of a camera; picking up voice information of a user according to the sound source location; and performing at least one control operation on a household appliance according to the voice information, and the voice information matches at least one corresponding control instruction.

In an optional embodiment, determining the sound source location by means of the camera includes: acquiring image information in a household appliance scenario by means of the camera; analyzing the image information to recognize user information in the household appliance scenario; and determining the sound source location according to the user information.

In an optional embodiment, the user information includes at least one of the following: the number of at least one user, a location of at least one user, and a mouth shape of at least one user; determining the sound source location according to the user information includes: when the number of the at least one user represents that there is one user, determining the location of this one user as the sound source location; and when the number of the at least one represents that there are a plurality of users, determining one user who produces a correct voice according to the mouth shape of the at least one user, and determining the location of this one user as the sound source location.

In an optional embodiment, picking up the voice information of the user according to the sound source location includes: enhancing at least one pickup audio signal of an array type dual microphone at the sound source location; and picking up the voice information of the user according to the at least one pickup audio signal.

In an optional embodiment, before determining the sound source location by means of the camera, the method further includes: acquiring wake-up operation information of the user, and the wake-up operation information includes at least one of the following: gesture information and voice information; and triggering the household appliance to switch from a standby state to a working state according to the wake-up operation information.

In an optional embodiment, after triggering the household appliance to enter into the working state according to the wake-up operation information, the method further includes: acquiring gesture information of the user; and performing the at least one control operation on the household appliance according to the gesture information.

In an optional embodiment, after the household appliance enters into the working state, when neither the voice information is picked up within a preset time period nor the gesture information is acquired within the preset time period, the household appliance is triggered to re-enter into the standby state.

In an optional embodiment, after triggering the household appliance to enter into the working state according to the wake-up operation information, the method further includes: acquiring end operation information from the user, and the end operation information includes at least one of the following: gesture information and voice information; and triggering the household appliance to exit the working state according to the end operation information.

The present disclosure also provides a household appliance control device. The device may include: a positioning component, configured to determine a sound source location by means of a camera; a pickup component, configured to pick up voice information of a user according to the sound source location; and a control component, configured to perform at least one control operation on a household appliance according to the voice information, and the voice information matches at least one corresponding control instruction.

In an optional embodiment, the positioning component includes: an image acquisition element, configured to acquire image information in a household appliance scenario by means of the camera; an information recognition element, configured to analyze the image information to recognize user information in the household appliance scenario; and a positioning element, configured to determine the sound source location according to the user information.

In an optional embodiment, the user information includes at least one of the following: the number of at least one user, a location of at least one user, and a mouth shape of at least one user; the positioning element is specifically configured to determine, when the number of the at least one user represents that there is one user, the location of this one user as the sound source location, and determine, when the number of the at least one represents that there are a plurality of users, one user who produces a correct voice according to the mouth shape of the at least one user, and determining the location of this one user as the sound source location.

In an optional embodiment, the pickup component includes: an enhancement element, configured to enhance at least one pickup audio signal of an array type dual microphone at the sound source location; and a pickup element, configured to pick up the voice information of the user according to the at least one pickup audio signal.

In an optional embodiment, further including: a wake-up component, configured to acquire wake-up operation information of the user, and the wake-up operation information includes at least one of the following: gesture information and voice information; and trigger the household appliance to switch from a standby state to a working state according to the wake-up operation information.

In an optional embodiment, further including: an exit component, configured to acquire end operation information from the user, and the end operation information includes at least one of the following: gesture information and voice information; and trigger the household appliance to exit the working state according to the end operation information.

The present disclosure also provides an intelligent air conditioner, and the intelligent air conditioner includes the above household appliance control device.

The present disclosure also provides a household appliance control system. The system may include: a camera, configured to capture image information in a household appliance scenario; an image recognition component, configured to extract the image information, and analyze the image information to determine a sound source location; a microphone, configured to pick up voice information of a user according to the sound source location; a voice recognition component, configured to analyze the voice information to determine at least one control instruction corresponding to the voice information; and a main control component, configured to perform at least one control operation on a household appliance according to the at least one control instruction.

In an optional embodiment, the main control component is further configured to control the microphone to enhance at least one pickup audio signal at the sound source location; and the microphone is further configured to pick up the voice information of the user according to the at least one enhanced pickup audio signal.

In an optional embodiment, the system further includes: a WIFI component, connected with a client to achieve interaction between the client and the main control component; the client, configured to interact with the main control component; and a voice playing component, configured to broadcast voice information to the user to achieve interaction with the user.

By means of the technical solution of the present disclosure, the location of the user can be detected by the camera, thereby enhancing the at least one pickup audio signal at the location of the user. Thus, the accuracy of voice recognition is improved, the user interaction is enhanced, and the user experience is improved.

DETAILED DESCRIPTION

The present disclosure is further described in detail below with reference to the accompanying drawings and specific embodiments, but is not limited.

Embodiment One

Figure 1:
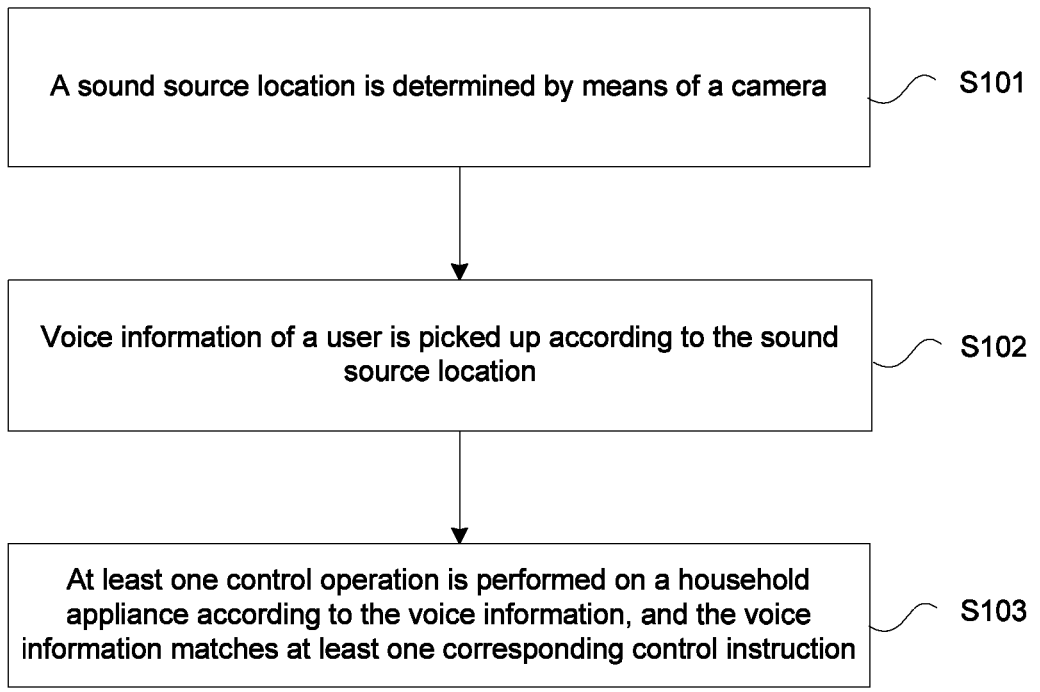
FIG. 1 is a flowchart of a household appliance control method according to an embodiment of the present disclosure.

FIG. 1 is a flowchart of a household appliance control method according to an embodiment of the present disclosure. As shown in FIG. 1, the method includes the steps as follows.

At step S101, a sound source location is determined by means of a camera.

At step S102, voice information of a user is picked up according to the sound source location.

At step S103, at least one control operation is performed on a household appliance according to the voice information, and the voice information matches at least one corresponding control instruction.

By means of the present embodiment, the location of the user can be detected by the camera, thereby enhancing at least one pickup audio signal at the location of the user. Thus, the accuracy of voice recognition is improved, the user interaction is enhanced, and the user experience is improved.

At step S101 the operation that the sound source location is determined by means of the camera may be implemented by the following steps. Image information in a household appliance scenario is acquired by means of the camera. The image information is analyzed to recognize user information in the household appliance scenario. And the sound source location is determined according to the user information. The user information includes at least one of the following: the number of at least one user, a location of at least one user, and a mouth shape of at least one user. The operation that the sound source location is determined according to the user information specifically includes the following steps. When the number of the at least one user represents that there is one user, the location of this one user is determined as the sound source location; and when the number of the at least one represents that there are a plurality of users, one user who produces a correct voice is determined according to the mouth shape of the at least one user, and the location of this one user is determined as the sound source location. By the above steps, the location of the user who performs the voice control operation can be accurately recognized, which provides a basis for subsequently improving the pickup accuracy of the voice information.

During specific implementation, at least one corresponding voice instruction may be set in advance, for example, cooling, heating, etc., and mouth shape information corresponding to the at least one voice instruction is input into the home appliance, thereby facilitating determination of the user who produces a correct voice according to the mouth shape information.

At step S102, the operation that voice information of the user is picked up according to the sound source location may be implemented by the following steps. At least one pickup audio signal of an array type dual microphone at the sound source location is enhanced; and voice information of the user is picked up according to the at least one pickup audio signal. Thus, an accuracy of picking up voice information can be effectively improved, an accuracy of home appliance voice control operation can be improved, and the user experience can be improved.

In addition, the present embodiment also provides a wake-up solution. That is, the home appliance is woken up by means of gesture recognition or voice recognition. Specifically, wake-up operation information of the user is acquired, and the wake-up operation information includes at least one of the following: gesture information and voice information; and the household appliance is triggered to switch from a standby state to a working state according to the wake-up operation information. After waking up the home appliance, the gesture information of the user may also be acquired; and the home appliance is controlled correspondingly according to the gesture information. That is, a home appliance gesture control operation is achieved.

In order to save an energy consumption of the home appliance, after the household appliance enters into the working state, when neither the voice information is picked up within a preset time period nor the gesture information is acquired within the preset time period, the household appliance is triggered to re-enter into the standby state.

In order to avoid mis-operation, the present embodiment also provides an exit solution. That is, end operation information is acquired from the user; and the home appliance is triggered to exit the working state according to the end operation information. The end operation information may include at least one of the following: gesture information and voice information.

The home appliance described in the present embodiment may be the household appliance such as an intelligent air conditioner.

Embodiment Two

Figure 2:
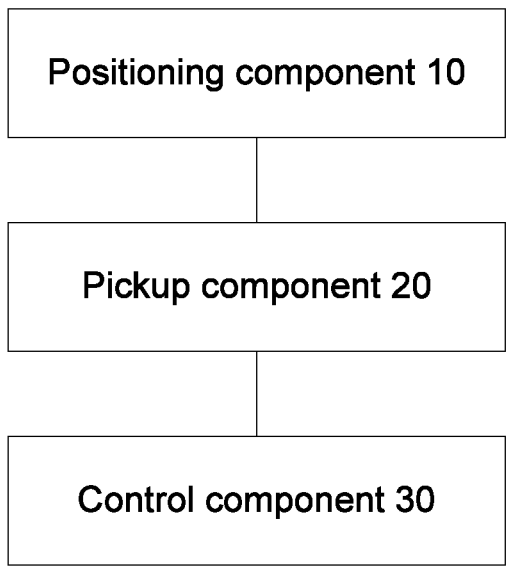
FIG. 2 is a block diagram of a household appliance control device according to an embodiment of the present disclosure.

Corresponding to the home appliance control method described in FIG. 1, the present embodiment provides a home appliance control device. A block diagram of a home appliance control device is shown in FIG. 2. The device includes a positioning component 10, a pickup component 20 and a control component 30.

The positioning component 10 is configured to determine a sound source location by means of a camera.

The pickup component 20 is connected with the positioning component 10, and is configured to pick up voice information of a user according to the sound source location.

The control component 30 is connected with the pickup component 20, and is configured to perform at least one control operation on a household appliance according to the voice information, and the voice information matches at least one corresponding control instruction.

By means of the present embodiment, the location of the user can be detected by the camera, thereby enhancing at least one pickup audio signal at the location of the user. Thus, the accuracy of voice recognition is improved, the user interaction is enhanced, and the user experience is improved.

In an optional embodiment, the positioning component 10 may include: an image acquisition element, configured to acquire image information in a household appliance scenario by means of the camera; an information recognition element, configured to analyze the image information to recognize user information in the household appliance scenario; and a positioning element, configured to determine the sound source location according to the user information. The user information includes at least one of the following: the number of at least one user, a location of at least one user, and a mouth shape of at least one user. The positioning element is configured to determine, when the number of the at least one user represents that there is one user, the location of this one user as the sound source location, and determine, when the number of the at least one represents that there are a plurality of users, one user who produces a correct voice according to the mouth shape of the at least one user, and determining the location of this one user as the sound source location. Thus, the location of the user who performs the voice control operation can be accurately recognized, which provides a basis for subsequently improving the pickup accuracy of voice information.

During specific implementation, a corresponding voice instruction may be set in advance, for example, cooling, heating, etc., and mouth shape information corresponding to the voice instruction is input into the home appliance, thereby facilitating determination of the user who produces a correct voice according to the mouth shape information.

In an optional embodiment, the pickup component 20 may include: an enhancement element, configured to enhance at least one pickup audio signal of an array type dual microphone at the sound source location; and a pickup element, configured to pick up the voice information of the user according to the at least one pickup audio signal. Thus, an accuracy of picking up voice information can be effectively improved, an accuracy of home appliance voice control operation can be improved, and the user experience can be improved.

In addition, the present embodiment also provides a wake-up solution. That is, the above device may further include: a wake-up component, configured to acquire wake-up operation information of the user, and the wake-up operation information includes at least one of the following: gesture information and voice information; and trigger the household appliance to switch from a standby state to a working state according to the wake-up operation information. In order to save the energy consumption of the home appliance, after the household appliance enters into the working state, when neither the voice information is picked up within a preset time period nor the gesture information is acquired within the preset time period, the household appliance is triggered to re-enter into the standby state In order to avoid mis-operation, the present embodiment also provides an exit solution. That is, the above device may further include: an exit component, configured to acquire end operation information from the user; and trigger the home appliance to exit the working state according to the end operation information. The end operation information includes at least one of the following: gesture information and voice information.

Figure 3:
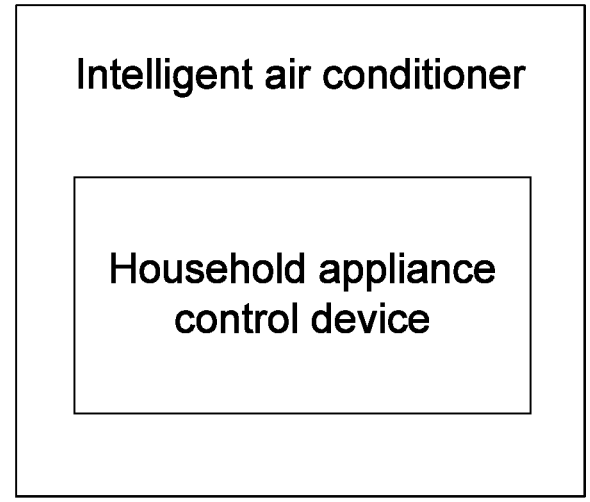
FIG. 3 is a block diagram of an intelligent air conditioner according to an embodiment of the present disclosure.

The present embodiment also provides an intelligent air conditioner. A block diagram of an intelligent air conditioner is shown in FIG. 3. The intelligent air conditioner includes the household appliance control device described above.

Embodiment Three

Figure 4:
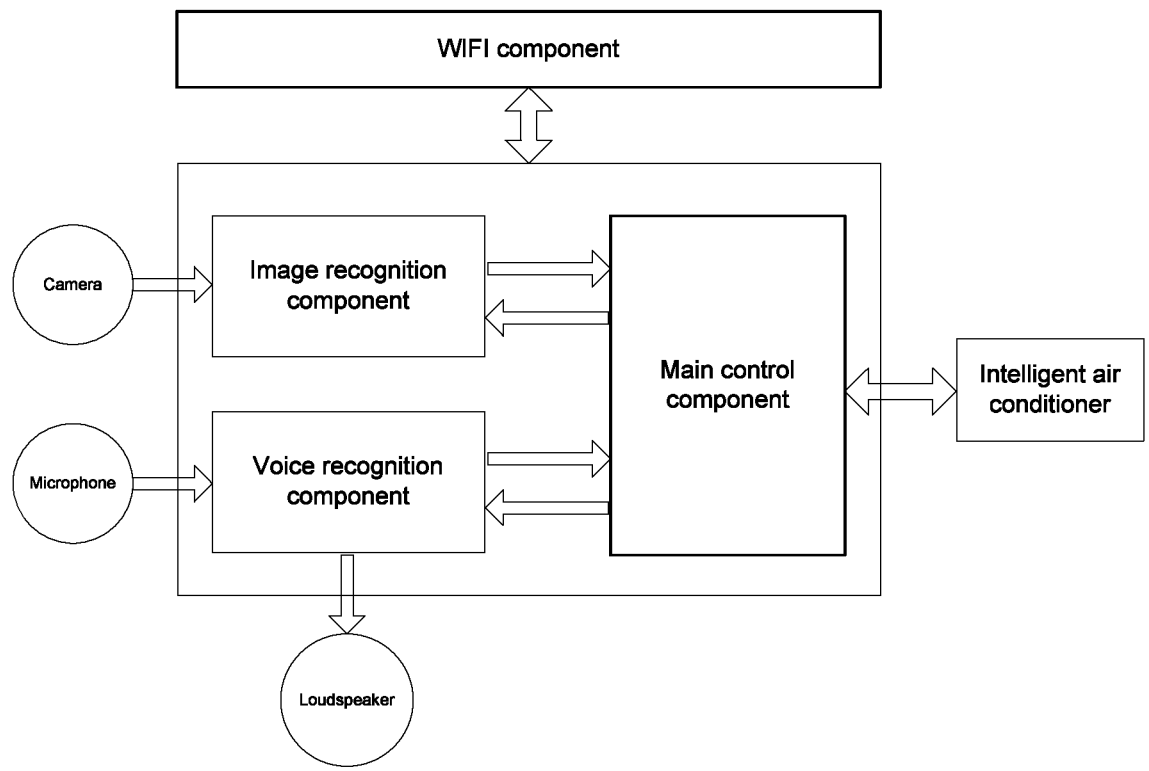
FIG. 4 is a block diagram of a household appliance control system according to an embodiment of the present disclosure.

Corresponding to the home appliance control device described in FIG. 2, the present embodiment provides a home appliance control system. A block diagram of a home appliance control system is shown in FIG. 4. The system includes a camera, an image recognition component, a microphone, a voice recognition component and a main control component.

The camera may be installed in an air conditioner, and is configured to capture image information in a household appliance scenario.

The image recognition component is configured to extract the image information, and analyze the image information to determine a sound source location. An analysis of the image information includes a presence of a person or not, human body features, human body recognition, and the like.

The microphone is configured to pick up voice information of a user according to the sound source location.

The voice recognition component is configured to analyze the voice information to determine at least one control instruction corresponding to the voice information.

The main control component is configured to perform at least one control operation on a household appliance according to at least one control instruction. It can also receive the analysis result of the image recognition component, and perform information interaction through a speaker, the microphone and a mobile phone client (namely a user side) or an air conditioner manufacturer customer service center according to the household appliance scenario.

In addition, the main control component is further configured to control the microphone to enhance at least one pickup audio signal at the sound source location; and the microphone is further configured to pick up the voice information of the user according to the at least one enhanced pickup audio signal. Thus, a pickup accuracy of voice information is improved, an accuracy of home appliance voice control operation is improved, and the user experience is improved.

The system further includes: a WIFI component, connected with a client to achieve interaction between the client and the main control component; the client (such as a mobile phone APP), connected with the WIFI component wirelessly, and configured to interact with the main control component; and a voice playing component, configured to broadcast voice information to the user to achieve interaction with the user.

The air conditioner is equipped with a camera and an array type dual microphone. A role of the microphone is to pick up at least one sound signal in an environment and transmit the at least one sound signal to the voice component for processing and recognition. The camera detects the image information in the household appliance scenario, transmits the image information to the image recognition component for processing and recognition, and determines a location and mouth shape (whether or not a voice is produced) of a human body in a room.

When the user needs to perform gesture or voice interaction, at least one wake-up operation is required first, and specific gesture actions and specific voice instructions can be woken up. For example, the gesture wake-up action may be that a palm hovers toward an air conditioner for a certain time, or the user may issue a voice instruction "Hello, intelligent air conditioner" to wake this intelligent air conditioner up. After wake-up, the gesture recognition component and the voice recognition component of the air conditioner can accept interactive instructions. After wake-up, gesture interaction and voice interaction may cross-issue instructions, the voice recognition component and the image recognition component continue to work, and parameters switch the corresponding instructions by taking the component signal processing time as the priority. After the user controls the air conditioner to completely send the instructions, the user can still actively control the air conditioner to exit the working state with a specific gesture or voice instruction, so that no malfunction is caused. For example, when the user control instruction is sent but the gesture action or voice instruction is not matched for a certain period of time, the air conditioner exits the working state and needs to be reawakened before the interaction is performed.

In the actual operating environment of home appliances such as air conditioners, there are mostly large environmental noises and relatively strong sound reflections. In a process of voice reception, the microphones are mixed with noise and human voice, which may cause inaccurate audio collection. The technical solution of the present disclosure includes the following steps. A user is positioned through a camera, a sound source at the location of the user is acquired, and then enhanced pickup processing is performed on at least one orientation signal from the sound source at the location of the user. When there is one person in an indoor scenario, the voice recognition component performs signal enhancement and noise reduction processing according to the person's azimuth. When detecting a large number of people, the orientation of the crowd is first determined, and a person who has a sounding mouth shape is positioned. Positioning is performed in combination with a dual microphone matrix type signal delay estimation algorithm and a strength estimation algorithm. That is, an accurate location of a sound source is determined by camera detection of the sounding user and voice positioning, and the voice recognition component performs signal enhancement and noise reduction processing during pickup according to the azimuth of this person.

As can be seen from the above description, the technical solution of the present disclosure breaks through the limitations of solving the voice interaction mode and the gesture interaction mode, and achieves the following effects. At one, the recognition rate of the home appliance voice interaction is improved. At two, the gesture, the voice wake-up and the operation enhance user interaction and enhance the application effect of home appliances such as air conditioners.

Of course, the above are optional implementations of the present disclosure. It is to be noted that a number of modifications and refinements may be made by those of ordinary skill in the art without departing from the basic principles of the present disclosure, and such modifications and refinements are also considered to be within the scope of protection of the present disclosure.

What is claimed is:

1. A household appliance control method, comprising:
acquiring image information in a household appliance scenario by means of a camera;
analyzing the image information to recognize user information in the household appliance scenario;
determining a sound source location according to the user information;
when a number of the user information represents that there are a plurality of users, determining one user who produces a correct voice according to a mouth shape of the plurality of users, and determining a location of the one user as the sound source location;
picking up voice information of a user according to the sound source location; and
performing at least one control operation on a household appliance according to the voice information, wherein the voice information matches at least one corresponding control instruction.

2. The method as claimed in claim 1, the method further comprising:
acquiring gesture information of the user; and
performing the at least one control operation on the household appliance according to the gesture information.

3. The method as claimed in claim 2, wherein after the household appliance enters into a working state, when neither voice information is picked up within a preset time period nor gesture information is acquired within the preset time period, the household appliance is triggered to re-enter into a standby state.

4. The method as claimed in claim 1, wherein picking up the voice information of the user according to the sound source location comprises:
enhancing at least one pickup audio signal of an array type dual microphone at the sound source location; and
picking up the voice information of the user according to the at least one pickup audio signal.

5. The method as claimed in claim 1, after triggering the household appliance to enter into the working state according to the wake-up operation information, the method further comprising:
acquiring end operation information from the user, wherein the end operation information comprises at least one of the following: gesture information and voice information; and
triggering the household appliance to exit the working state according to the end operation information.

6. The method as claimed in claim 1, wherein, before determining the sound source location by means of the camera, the method further comprises:
acquiring wake-up operation information of the user, wherein the wake-up operation information comprises at least one of the following: gesture information and voice information; and triggering the household appliance to switch from a standby state to a working state according to the wake-up operation information.

7. A household appliance control device, comprising:
a positioning component, configured to acquire image information in a household appliance scenario by means of a camera, analyze the image information to recognize user information, which comprises at least one of a number of at least one user, a location of at least one user and a mouth shape of at least one user, in the household appliance scenario, determine a sound source location according to the user information, and when the number of the at least one user represents that there are a plurality of users, determine one user who produces a correct voice according to the mouth shape of the at least one user, and determine the location of the one user as the sound source location;
a pickup component, configured to pick up voice information of a user according to the sound source location; and
a control component, configured to perform at least one control operation on a household appliance according to the voice information, wherein the voice information matches at least one corresponding control instruction.

8. The device as claimed in claim 7, wherein the pickup component comprises:
an enhancement element, configured to enhance at least one pickup audio signal of an array type dual microphone at the sound source location; and
a pickup element, configured to pick up the voice information of the user according to the at least one pickup audio signal.

9. The device as claimed in claim 7, further comprising:
an exit component, configured to acquire end operation information from the user, wherein the end operation information comprises at least one of the following: gesture information and voice information; and trigger the household appliance to exit the working state according to the end operation information.

10. An intelligent air conditioner, comprising the household appliance control device as claimed in claim 7.

11. The device as claimed in claim 7, wherein the device further comprises:
a wake-up component, configured to acquire wake-up operation information of the user, wherein the wake-up operation information comprises at least one of the following: gesture information and voice information; and trigger the household appliance to switch from a standby state to a working state according to the wake-up operation information.

12. A household appliance control system, comprising:
a camera, configured to capture image information in a household appliance scenario;
an image recognition component, configured to extract the image information, and analyze the image information to recognize user information, which comprises at least one of a number of at least one user, a location of at least one user, and a mouth shape of at least one user, in the household appliance scenario, determine a sound source location according to the user information, and when the number of the at least one user represents that there are a plurality of users, determine one user who produces a correct voice according to the mouth shape of the at least one user, and determine the location of the one user as the sound source location;
a microphone, configured to pick up voice information of a user according to the sound source location;
a voice recognition component, configured to analyze the voice information to determine at least one control instruction corresponding to the voice information; and
a main control component, configured to perform at least one control operation on a household appliance according to the at least one control instruction.

13. The system as claimed in claim 12, wherein
the main control component is further configured to control the microphone to enhance at least one pickup audio signal at the sound source location; and
the microphone is further configured to pick up the voice information of the user according to the at least one enhanced pickup audio signal.

14. The system as claimed in claim 12, further comprising:
- a WIFI component, connected with a client to achieve interaction between the client and the main control component;
- the client, configured to interact with the main control component; and
- a voice playing component, configured to broadcast voice information to the user to achieve interaction with the user.

* * * * *